(No Model.)
J. H. SMITH
CULTIVATOR TOOTH.
No. 261,636. Patented July 25, 1882.
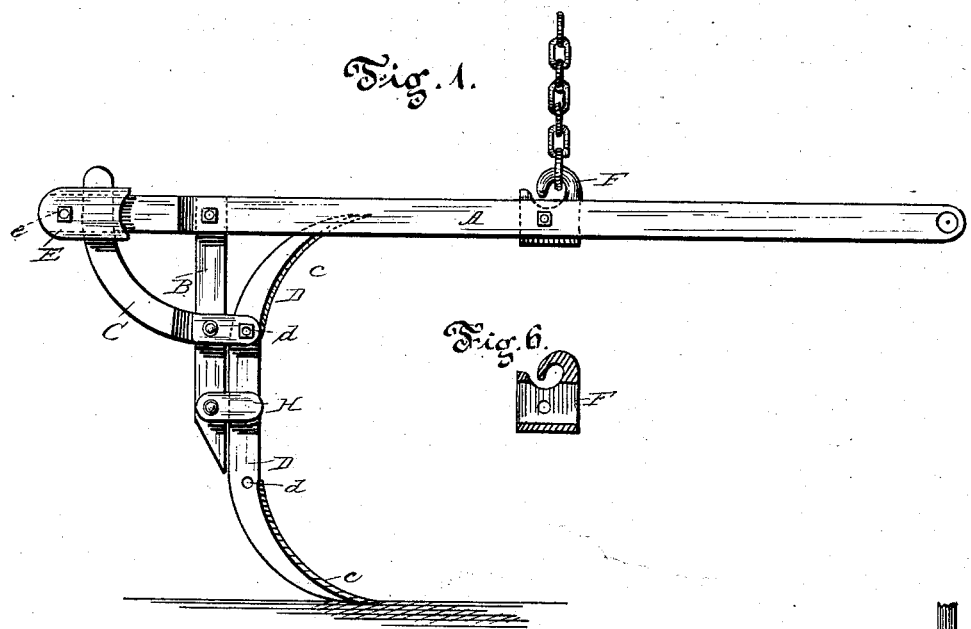
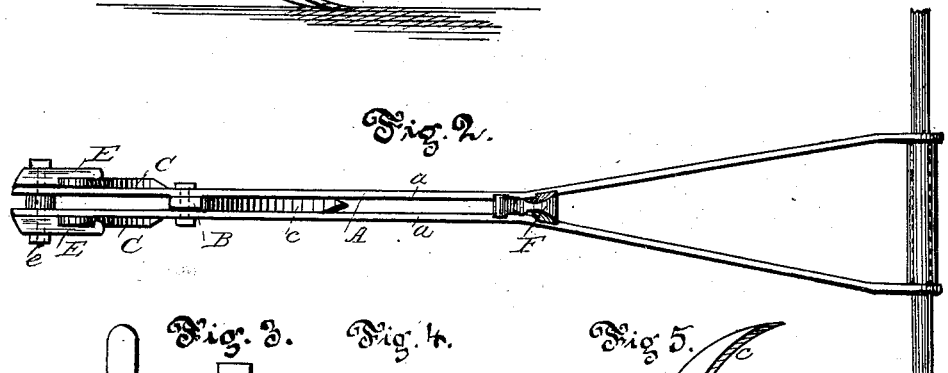
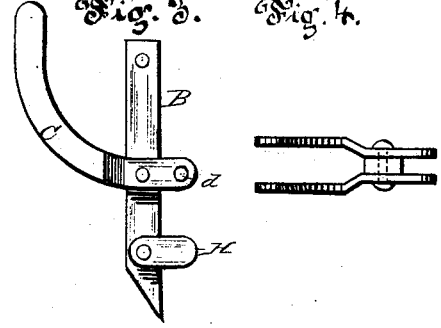 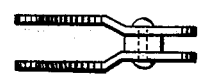 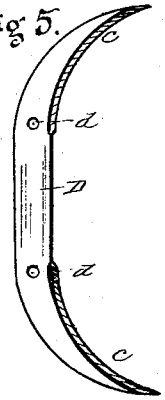
WITNESSES:
Fred G. Dieterich
Wm Holfenter
INVENTOR.
James H. Smith
by De Witt C. Allen,
ATTORNEY
N. PETERS, Photo-Lithographer, Washington, D. C.

United States Patent Office.

JAMES H. SMITH, OF FOND DU LAC, WISCONSIN, ASSIGNOR TO THE WHEEL AND SEEDER COMPANY, OF SAME PLACE.

CULTIVATOR-TOOTH.

SPECIFICATION forming part of Letters Patent No. 261,636, dated July 25, 1882.

Application filed May 9, 1882. (No model.)

*To all whom it may concern:*

Be it known that I, JAMES H. SMITH, a citizen of the United States, residing at Fond du Lac, in the county of Fond du Lac and State of Wisconsin, have invented certain new and useful Improvements in Devices for Bracing Cultivator-Teeth; and I do hereby declare the following to be a full, clear, and exact description of the invention, such as will enable others skilled in the art to which it appertains to make and use the same.

This invention relates to certain new and useful improvements in devices for bracing a cultivator-tooth, more especially designed for use in connection with the class of cultivator-teeth that have a shank and a shovel at each end; and to this end the invention consists in novel features of construction, and combination and arrangement of parts, all as will be hereinafter fully described, and set forth in the claims hereto annexed.

Referring to the accompanying drawings, Figure 1 represents a side elevation of my improvements as applied to the drag-bar; Fig. 2, a top view or plan; Figs. 3, 4, 5, and 6, detached views.

In the drawings, A represents a wrought-iron drag-bar, formed of two parallel bars, *a a*, arranged a short distance apart, all as clearly shown in Fig. 2, and B the standard, pivotally connected at its upper end between the bars *a a* of the drag-bar by a bolt passing through it and said bars *a a*.

E E represent cast-iron washers secured to the rear end and outer sides of the drag-bar A by a clamping-bolt, *e*, and between said washers and the bar A pass the upper ends of the curved or segmental bars *c c*, forming the double brace C, which projects beyond the standard B, which it embraces, and secured thereto by any suitable means. The lower projecting ends of the double brace C embraces the cultivator-tooth D, which is secured thereto by a bolt and nut, *d*, all as clearly shown in Fig. 1.

H H are wrought-iron clips, by which the shank of the double-reversible tooth is centrally connected to the lower end of standard B.

The tooth D is composed of a shank having a shovel at each end, and is reversible, as said shank is provided with bolt-holes equidistant from its center, by which, when reversed, it may be secured to the double brace C.

F represents the chain-hook, secured by any suitable means between the bars *a a* of the drag-bar A, all as clearly shown in Figs. 1 and 2.

By tightening the nut of the clamping-bolt *e* the tooth can be held at any point desired, as the washers E are clamped to the outside of the beam and double brace, forming a friction-clutch for the brace, which allows the tooth to give way or yield to any immovable obstacles without breaking.

By removing the bolt *d*, the shank may be reversed or turned end to end, so as to bring either shovel into operation.

The advantages of the above-described reversible tooth (which in itself is common) are well known to persons skilled in the art to which it appertains.

The above-described arrangement of parts for securing the tooth in position combine durability and simplicity in their construction, while being readily and quickly manipulated when it is desired to reverse the shank to bring either shovel into operation.

Having thus fully described my invention, what I claim as new, and desire to secure by Letters Patent, is—

1. The combination, with the beam A, reversible cultivator-tooth D, and pivoted standard B, of the double brace C, connected at its upper end to the rear end of said beam, and its lower end embracing and connected to said standard and the shank of said tooth, substantially as and for the purpose herein shown and described.

2. The combination, with the beam A, reversible cultivator-tooth D, and pivoted standard B, of the double brace C, connecting said standard and tooth with the beam, and the clips H H for centrally connecting the shank of the tooth to the standard, substantially as and for the purpose specified.

3. The combination, with the beam A, composed of the parallel bars *a a*, and having a friction-clutch at its rear end, of the standard B, pivotally connected at its upper end between said bars *a a*, the reversible tooth, the double brace C, connected at its upper end to said beam by the friction-clutch and embracing and connected to said standard and tooth, and the clips H H, all arranged substantially as herein shown and described.

In testimony whereof I affix my signature in presence of two witnesses.

JAMES H. SMITH.

Witnesses:
  J. H. HAUSER,
  CHARLES H. WESTON.